United States Patent [19]

Shimoyashiki et al.

[11] 4,255,371

[45] Mar. 10, 1981

[54] PROCESS FOR PRODUCING OLEFINIC RESIN FOAMS

[75] Inventors: Nobuyoshi Shimoyashiki, Isehara; Teruo Masukawa, Fujisawa; Fusao Imai, Kamakura, all of Japan

[73] Assignee: Japan Styrene Paper Corporation, Tokyo, Japan

[21] Appl. No.: 3,540

[22] Filed: Jan. 15, 1979

[30] Foreign Application Priority Data

Jan. 20, 1978 [JP] Japan .................................. 53-50008

[51] Int. Cl.³ ............................................ B29D 27/00
[52] U.S. Cl. ...................................... 264/54; 264/85; 264/176 R; 264/DIG. 18; 264/176 F; 521/80; 521/95; 521/96
[58] Field of Search ................... 264/DIG. 18, 54, 51, 264/85, 176

[56] References Cited

U.S. PATENT DOCUMENTS

| | | | |
|---|---|---|---|
| 3,098,831 | 7/1963 | Carr | 264/DIG. 18 |
| 3,250,731 | 5/1966 | Buhl et al. | 264/DIG. 18 |
| 3,394,214 | 7/1968 | Benning | 264/DIG. 18 |
| 4,049,757 | 9/1977 | Kammel et al. | 264/DIG. 18 |

FOREIGN PATENT DOCUMENTS 52-18232  5/1977  Japan .

*Primary Examiner*—Philip Anderson
*Attorney, Agent, or Firm*—Sherman & Shalloway

[57] ABSTRACT

In a process for producing an olefinic resin foam which comprises the steps of forming a composition comprising an olefinic resin, a chemical blowing agent and a crosslinking agent into an unfoamed sheet-like or rod-like shaped article and foaming it by heating, the improvement wherein the heat-forming step is carried out in an oxygen-free atmosphere or in an atmosphere containing not more than 10% of oxygen.

7 Claims, No Drawings

PROCESS FOR PRODUCING OLEFINIC RESIN FOAMS

This invention relates to a process for producing olefinic resin foams.

Olefinic resin foams are currently produced for the most part by (A) a method which comprises melting and kneading an olefinic resin together with a blowing agent (mainly a volatile blowing agent) in an extruder, and extruding the molten mixture through a die to obtain a non-crosslinked foam, or (B) a method which comprises melting and kneading an olefinic resin together with a chemical blowing agent and a crosslinking agent in an extruder, extruding the mixture through a die to form an unfoamed and non-crosslinked crosslinked extrudate, and then heating the extrudate in a heating furnace to perform its foaming or its foaming and crosslinking. The non-crosslinked foam produced by method (A) has unsatisfactory thermal stability and mechanical strength. In the production of an olefinic resin foam by method (B), for example by the procedure suggested in Japanese Patent Publication No. 18232/77, the chemical blowing agent remains partly undecomposed to give a yellow foam. Since the colored foam greatly impairs its merchandise value, a special measure needs to be taken to decolor such a product.

It is an object of this invention therefore to eliminate the defect of the prior art, and to provide a process for producing an olefinic resin foam which is white and has superior properties and a high expansion ratio.

The object of the invention is achieved by an improved process for producing an olefinic resin foam which comprises the steps of foaming a composition comprising an olefinic resin, a chemical blowing agent and a crosslinking agent into an unfoamed sheet-like or rod-like shape, and foaming it by heating, said foaming step being carried out in an oxygen-free atmosphere or an atmosphere containing not more than 10% of oxygen.

The olefinic resin used as a starting material in this invention includes polymers or copolymers of aliphatic monolefins such as polyethylene produced by a high-pressure, medium-pressure or low-pressure process, polypropylene, polybutene, an ethylene/propylene copolymer, an ethylene/butene copolymer, an ethylene/vinyl acetate copolymer and an ethylene/ethyl acrylate copolymer, and mixtures of these with rubbers, styrene-type resins or polyacrylonitrile.

Examples of suitable crosslinking agents are peroxides such as dicumyl peroxide, 2,5-dimethyl-2,5-di(tertiary butyl peroxy)hexane, di-tertiary butyl perterephthalate, tertiary butyl hydroperoxide, and 1,3-bis(tertiary butyl peroxyisopropyl)benzene.

The chemical blowing agent used in this invention is a so-called decomposable blowing agent which is an organic compound that decomposes at a temperature of at least 140° C. to generate gases. Examples are azodicarbonamide (decomposition temperature 190°–230° C.), benzene-1,3-disulfohydrazide (146° C.), diphenylsulfone-3,3'-disulfohydrazide (148°), diphenyl oxide-4,4'-disulfohydrazide (150° C.), and N,N'-dinitrosopentamethylene tetramine (160° to 200° C.).

The unfoamed shaped article of olefinic resin composition to be foamed by heating in the process of this invention (to be referred to as an intermediate shaped article) may be in the non-crosslinked or crosslinked state. It may be of various shapes such as a sheet, rod or pillar. The intermediate shaped article is prepared by mixing 100 parts by weight of an olefinic resin, 0.01 to 5 parts by weight of a crosslinking agent and 0.01 to 35 parts by weight of a blowing agent, and shaping the mixture. Generally, it is preferred to form a sheet-like shaped article. The sheet may be obtained by kneading the ingredients by a heated roll and thus making them into a sheet form. Alternatively, after roll kneading, the mixture may be extruded through an extruder at a temperature of 110° to 150° C. In an especially preferred embodiment, the uncooled, crosslinked or non-crosslinked, unfoamed sheet extruded from the extruder is directly introduced into a heating furnace. The thickness of the sheet may be in the range of 0.1 to 50 mm.

The resulting intermediate shaped article is then heated in a heating furnace in an oxygen-free atmosphere or an atmosphere having an oxygen concentration of not more than 10%, preferably not more than 5%, more preferably not more than 2%. When the oxygen concentration of the heating atmosphere is more than 10%, a white beautiful olefinic resin foam cannot be obtained. The lower the oxygen concentration, the more the degree of whiteness and the higher the expansion ratio. An oxygen-free atmosphere is best suited.

Generally, an atmosphere having an oxygen concentration of not more than 10% is provided most simply and conveniently by substituting an oxygen-free inactive gas such as $N_2$ or $CO_2$ for the air in the heating furnace. It would be feasible also to remove oxygen by absorption or adsorption using an oxygen absorbent or adsorbent.

The heating temperature in the heating furnace is above the decomposition temperature of the chemical blowing agent. Generally, it is 200° to 260° C., preferably 220° to 240° C. The heating time varies according to the thickness of the intermediate shaped article, the heating temperature, the oxygen concentration of the heating atmosphere, etc. Periods of about 3 to 20 minutes are generally preferred.

The heating furnace used in this invention may be of the type which is adapted to heat the resin sheet while conveying it continuously using a conveyor belt, wire gauze belt or the like. Heating in the heating furnace can be performed, for example, by radiation using a nichrome wire, infrared rays, etc., or by forced convection of a heated inactive gas such as nitrogen and carbon dioxide gas within the furnace.

The olefinic resin foam in accordance with this invention may contain various additives such as antioxidants, pigments, fire-retarding agents, antistatic agents and auxiliary agents.

The process of this invention enables the continuous production of a white olefinic resin foam having a high expansion ratio by a simple operation.

The following Examples illustrate the invention more specifically.

EXAMPLE

One hundred parts by weight of low-density polyethylene (NUC-9026, a trademark for a product of Nippon Unicar Co., Ltd.), 20 parts by weight of azodicarbonamide and 0.8 part by weight of dicumyl peroxide were kneaded by a roll heated at 115° C. The resulting sheet was pelletized by a pelletizer, and introduced into an extruder. The pellets were extruded through a T-die at a maximum extrusion temperature of 125° C. to form an unfoamed, non-crosslinked sheet (intermediate shaped article) having a thickness of 2 mm and a width of 200 mm. The intermediate shaped article was heated in a heating furnace in an atmosphere having each of the various oxygen concentrations tabulated below. The expansion ratios and the degrees of whiteness of the products were measured, and the results are tabulated below.

Relation between oxygen concentration and expansion ratio

| Oxygen | Heating temperature | | |
|---|---|---|---|
| concentration | 240° C. | 230°C. | 220° C. |
| 21% | 10.3 | 17.2 | 18.5 |
| 15% | 14 | 18.2 | 22.2 |
| 10% | 20 | 24.2 | 24 |
| 5% | 25.7 | 26.2 | 25.7 |
| 1% | 31.2 | 33.2 | 31.2 |

Relation between oxygen concentration and the degree of whiteness (Hunter whiteness)

| Oxygen | Heating temperature | | |
|---|---|---|---|
| concentration | 240° C. | 230° C. | 220° C. |
| 21% | 53 | 53.2 | 55.2 |
| 15% | 54.5 | 55.2 | 55.4 |
| 10% | 62.5 | 60.4 | 61 |
| 5% | 66.7 | 66.4 | 65.5 |
| 1% | 68.2 | 69.2 | 69.4 |

The Hunter whiteness was measured by a digital color difference meter (ND-101D type, a product of Nippon Denshoku Kogyo K.K.), and expressed by comparison with the whiteness of a vacuum-deposited magnesium oxide coating on a mirror surface which was taken as 100. It is seen from the above results that the Hunter whiteness can be maintained at 60 or more by adjusting the oxygen concentration to not more than 10%. Products having a Hunter whiteness of less than 60 were clearly found to be colored when observed with unaided eyes.

The physical properties of the product of this invention were compared with those of a non-crosslinked polyolefin foam sheet obtained by extrusion foaming. The results are shown below.

| Sample | Base resin | Expansion ratio | Thermal stability (°C.) | Tensile strength (kg/cm$^2$) LD | Tensile strength (kg/cm$^2$) TD | Tear strength (Kg/cm$^2$) LD | Tear strength (Kg/cm$^2$) TD |
|---|---|---|---|---|---|---|---|
| Conventional proudct | Low-density polyethylene | 30 | 60 | 1.2 | 0.9 | 0.6 | 0.5 |
| Product of the invention | Low-density polyethylene | 30 | 80 | 4.1 | 3.2 | 2.2 | 2.4 |

The tensile strength and tear strength were measured in accordance with JIS K-6767. LD stands for "longitudinal direction", and TD, "transverse direction".

What is claimed is:

1. A process for producing an olefinic resin foam which comprises forming a composition comprising an olefinic resin, a chemical blowing agent and a cross-linking agent into a non-cross-linked and unfoamed sheet-like or rod-like shaped article and cross-linking and foaming the resin by heating at a temperature of 220° to 240° C. in an oxygen-free atmosphere or in an atmosphere containing not more than 10% of oxygen.

2. The process of claim 1 wherein the shaped article to be submitted to the heat-foaming step is as-extruded from an extruder and in the uncooled state.

3. The process of claim 1 wherein the unfoamed shaped article is introduced into a heating furnace and heat-foamed while being supported on a wire gauze moving at a fixed speed.

4. A process for producing an olefinic resin foam having a high expansion ratio and a high degree of whiteness which comprises forming a composition comprising an olefinic resin which is a member selected from the group consisting of polyethylene, polypropylene, polybutene, ethylene/propylene copolymer, ethylene/butene copolymer, ethylene/vinyl acetate copolymer, and ethylene/ethyl acrylate copolymer; a chemical blowing agent which is a member selected from the group consisting of azodicarbonamide, benzene-1,3-disulfohydrazide, diphenylsulfone-3,3'-disulfohydrazide, diphenyl oxide-4,4'-disulfohydrazide, and N,N'-dinitrosopentamethylene tetramine; and a cross-linking agent which is a member selected from the group consisting of dicumyl peroxide, 2,5-dimethyl-2,5-di(tertiary butyl peroxy)hexane, di-tertiary butyl perterephthalate, tertiary butyl hydroperoxide, and 1,3-bis(tertiary butyl peroxyisopropyl) benzene into a non-cross-linked and unfoamed sheet-like or rod-like shaped article and cross-linking and foaming the resin by heating at a temperature of 220° to 240° C. in an oxygen-free atmosphere or in an atmosphere containing not more than 10% of oxygen.

5. The process of claim 4 wherein the non-cross-linked and unfoamed sheet-like or rod-like shaped article is formed by mixing 100 parts by weight of an olefinic resin, 0.01 to 5 parts by weight of a cross-linking agent and 0.01 to 35 parts by weight of a blowing agent and shaping the mixture.

6. The process of claim 4 wherein the non-cross-linked and unfoamed sheet-like or rod-like shaped article is foamed in an inert atmosphere consisting essentially of $N_2$ or $CO_2$.

7. The process of claim 4 wherein the non-cross-linked and unfoamed sheet-like or rod-like shaped articles are heated at a temperature of 220° to 240° C. for a period of 3 to 20 minutes.

* * * * *

UNITED STATES PATENT AND TRADEMARK OFFICE
CERTIFICATE OF CORRECTION

PATENT NO. : 4,255,371
DATED : March 10, 1981
INVENTOR(S) : Nobuyoshi Shimoyashiki, et al.

It is certified that error appears in the above—identified patent and that said Letters Patent is hereby corrected as shown below:

Page 1, item [30] should read as follows:

Jan. 20, 1978 [JP] Japan ............. 53-5008

Signed and Sealed this

Sixteenth Day of June 1981

[SEAL]

Attest:

RENE D. TEGTMEYER

Attesting Officer

Acting Commissioner of Patents and Trademarks